Figure 1:
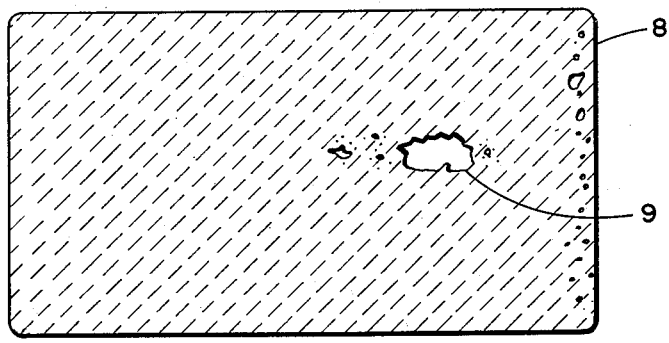

Nov. 3, 1959  K. H. SANDMEYER  2,911,313
FUSED CAST REFRACTORY ARTICLES AND METHOD OF MAKING THEM
Filed Nov. 16, 1956

INVENTOR.
KARL H. SANDMEYER

ATTORNEY

United States Patent Office 2,911,313
Patented Nov. 3, 1959

2,911,313

FUSED CAST REFRACTORY ARTICLES AND METHOD OF MAKING THEM

Karl H. Sandmeyer, Niagara Falls, N.Y., assignor to The Carborundum Company, Niagara Falls, N.Y., a corporation of Delaware Application November 16, 1956, Serial No. 622,695

6 Claims. (Cl. 106—59)

This invention relates to fused cast refractories and a method of making them. More particularly, the invention pertains to the manufacture of fused cast articles obtained from fusions consisting entirely of chromite ore or consisting of fusions of chromite ore with other materials. Fused cast articles of the type with which the present invention is concerned are made by fusing the desired raw materials and pouring or casting the resulting molten material into a mold and slowly cooling to form the fused cast article.

Fused cast refractory articles made from fusions of raw materials in which chromite ore constituted one of the major ingredients of the raw batch have been known and used for many years. Fusions have been made from 100% chromite ore and also from mixtures of chromite ore and magnesite. Patent No. 2,063,154 to Easter and McMullen describes fused refractory compositions formed from the fusion of mixtures of chromite ore and fused alumina, as for example, fusions of around 25 parts by weight of chromite ore with 75 parts by weight of fused alumina, the proportions of minor ingredients in the fused cast article being such as to provide a certain type of crystalline structure within the resulting article. Patent No. 2,279,260 to Benner, Baumann and Easter describes still other fused refractory compositions derived from fusions of alumina and chromite ore.

Regardless of the specific refractory composition embodying chromite ore disclosed in the prior art, the resulting cast refractory articles have always exhibited a wormy and porous structure throughout the body of the article. For example, cast refractory articles made from fusions of about 75 parts of fused alumina to 25 parts of chromite ore in accordance with the teachings of Patent No. 2,063,154 have had sufficient distributed porosity that the articles have had a normal apparent or bulk density in the neighborhood of 3.00 to 3.20. Although the inherent character of the composition itself has been one of great resistance to corrosion and erosion, it is a well known fact that the rate of corrosion and erosion of a refractory material in use is dependent to a great extent upon the amount of surface exposed to the corrosive and erosive influences. Consequently, the existence of a porous structure throughout the body of cast refractories made from fusions containing chromite ore has detracted greatly from the high corrosion and erosion resistance potentially obtainable from such bodies.

It is an object of the present invention to provide fused cast refractories containing or composed of chromite ore which are dense and substantially non-porous except for the unavoidable shrinkage cavity common to compositions in dense fused cast form.

It is a further object to provide a method of treating chromite ore to condition it for fusion in the making of fused cast refractory articles.

It is a further object to provide a method of making fused cast refractory articles from fusions of or containing chromite ore.

It is still another object to provide improved fused cast refractory shapes derived from fusions of chromite ore with or without other constituents.

Other objects and advantages accruing from the present invention will become apparent as the description proceeds.

I have discovered that improved fused cast refractory articles of high bulk density and of substantially non-porous structure except for a localized shrinkage cavity can be made from fusions containing chromite ore as the sole or one of the major constituents of the raw batch if the chromite ore is subjected to a heat-treatment at a sufficiently high temperature prior to the fusion operation. For example, I have made fused cast articles of improved density and physical structure from fusions of chromite ore and alumina in accordance with the aforementioned Patents 2,063,154 and 2,279,260 wherein the chromite ore was heat-treated prior to its fusion with the alumina. A representative fused cast refractory made according to the latter patent is one consisting principally of trigonal crystals of a solid solution of alumina and chromic oxide in which the chromic oxide is at least 8% and the alumina and chromic oxide together amount to at least 80% by weight of the article, the article also comprising 2–6% FeO, 1–6% MgO, and 2–7% of acid oxides, the acid oxide being present in amount sufficient to materially inhibit the formation of spinel crystals within the article. I have found that the chromite ore is greatly beneficiated for use in fusions for the making of fused cast refractory shapes if it is sintered or roasted at a temperature of at least 800° C. When the roasting or sintering of the ore is carried out at the minimum temperature of 800° C. it is necessary that the roasting be carried out under conditions such that the effect of the heat treatment is thorough. For example, if the chromite ore is roasted in bulk in a discontinuous or batch operation, the ore should be held at the peak temperature of 800° C. for a sufficient period of time to permit the heat-treatment to be effective throughout the entire mass of the ore being roasted. The period of time at which the ore must be held at maximum temperature depends upon the bulk or volume of ore being roasted at one time and the specific temperature of the roast. The higher the temperature at which the chromite ore is roasted, the shorter the period of time required for holding the ore at maximum or peak temperature. Satisfactory results have been obtained with ore roasted at temperatures of 1200° C. and 1400° C. and, in fact, ore which has been heat-treated by a complete fusion prior to its use in the raw batch for fusion casting of the refractory articles has been found acceptable. In other words, there is no particular critical upper limit to the temperature at which the chromite ore must be heat-treated prior to its use in the fusion operation in order to obtain satisfactory results in respect of the physical properties of the fused cast article.

After the chromite ore has been subjected to the required heat-treatment, it, together with any other ingredients of the raw batch, is fused and the molten material cast into molds and cooled in accordance with well known practices such as the procedure fully described in the above Patent 2,063,154.

Although any of the usual chromite ores can be used in carrying out the present invention, it is preferred to use a chromite ore containing a reasonably high percentage of chromium oxide by oxide analysis. The following are analyses of two typical chromite ores that can be utilized in making fused cast refractory articles in accordance with the present invention and that have been used for that purpose.

|  | Philippine Chromite Ore | Turkish Chromite Ore |
|---|---|---|
| Alkali Oxides ($Na_2O$ and $K_2O$) | 0.16 | 0.10. |
| $Cr_2O_3$ | 30.09 | 50.84. |
| $Al_2O_3$ | 33.14 | 13.81. |
| $SiO_2$ | 4.59 | 3.12. |
| $Fe_2O_3$ | 13.22 | 14.86. |
| $TiO_2$ | 0.23 | 0.33. |
| MgO | 17.50 | 17.04. |
| CaO | 0.34 | <0.10. |
| Ignition | 0.73 | Not determined. |
| Total Carbon | 0.11 | Do. |

Figure 1 is a graphic cross-sectional view through a fused cast refractory brick of standard size (9" x 4½" x 2½") made from a mixture of fused alumina and pre-heat-treated chromite ore in accordance with the present invention, and is illustrative of the dense, non-porous structure obtained throughout the cast shape.

Figure 2:
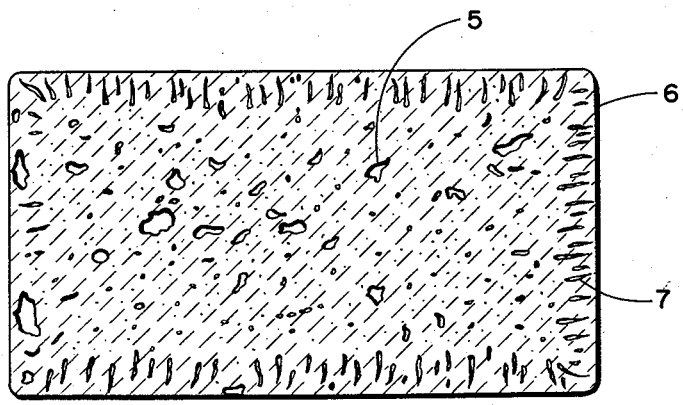
Figure 2:

Figure 2 is a similar graphic cross-sectional view through a fused cast refractory shape of standard size (9" x 4½" x 2½") having the same composition as the article shown in Figure 1 but made in accordance with prior art practice in that the chromite ore was given no heat treatment prior to its fusion with the alumina and casting to shape. Figure 2 is representative of the wormy and porous structure obtained in fused cast articles containing chromite and made according to prior art practice.

Table I below presents the results obtained in a number of fusions of chromite ore with fused alumina and is illustrative of the effect of various pre-heat-treatments of the chromite ore upon the physical structure and density of the resulting fused cast article. The chromite ore used in the various fusions of Table I, and also in the remaining tables where Philippine chromite ore is specified, is a Philippine chromite ore, a representative analysis of which is set forth above. The fused alumina used in the various fusions of Table I and the other tables was a fused alumina by-product containing approximately 95% alumina, the balance being chiefly oxides of iron and titanium.

tained when fused alumina and chromite ore are used in making fused cast shapes in accordance with conventional prior art practice wherein the chromite ore is subjected to no treatment prior to the fusion operation.

The worminess and porosity distributed throughout the body of the block characteristic of articles made with untreated chromite ore as part of the raw batch, such as articles made according to fusion No. 1, is graphically depicted in Figure 2 of the drawing which was sketched from an actual photograph of a section through the middle of a fused cast brick 9" x 4½" x 2½" in size made according to fusion No. 1. The pores 5 are scattered throughout the block 6 with a large number of elongated pores or pinholes 7 disposed beneath the surfaces of the block normal to the surface. Obviously, the multitude of pores throughout the article provide much more surface to be attacked by corrosion and erosion elements present in use of the block and increase tremendously the rate of wear of the block in service.

Fusion No. 2 was carried out with a chromite ore which prior to fusion had been passed through a commercial rotary drier in which the maximum drying temperature reached 432° C., the dried chromite ore having a residual moisture content of .04% and an ignition loss of .85%. Fusion No. 2 demonstrates that mere drying of the chromite ore is not sufficient to produce the beneficial results of the present invention, the resulting products when commercially dried chromite ore is used having a bulk density of only 3.11 and being porous throughout. Fusions No. 3 and 4 similarly represent mixes in which the chromite ore has been subjected prior to fusion to a heat-treatment of 600° C. for 5 hours, and a heat-treatment of 800° C. without being held at the maximum temperature any period of time, respectively. In each instance it was found that the preliminary heat treatment of the chromite ore was inadequate to produce the desired results, the resulting fused cast articles exhibiting low bulk densities of around 3.14 and 3.16, respectively, both being wormy and porous throughout. Fusions Nos. 5–9, inclusive, are representative of fused cast articles made in accordance with the present invention wherein the chromite ore was subjected to heat-treatments prior

*Table I*

|  | Fusion No. | | | | | | | | |
|---|---|---|---|---|---|---|---|---|---|
|  | 1 | 2 | 3 | 4 | 5 | 6 | 7 | 8 | 9 |
| Percent Philippine Chrome Ore | 25 | 25 | 25 | 25 | 25 | 25 | 25 | 25 | 25. |
| Percent Fused Alumina | 75 | 75 | 75 | 75 | 75 | 75 | 75 | 75 | 75. |
| Pretreatment of Chrome Ore | None | Passed through commercial rotary drier, 432° C. (900° F.) | 600° C. for 5 hrs. | 800° C. No holding at maximum temp. | 800° C. for 5 hrs. | Dried Ore of No. 2 Also Roasted 800° C., 5 hrs. | 1,010° C. for 1 hour. | 1,200° C. for 5 hours. | 1,400° C. for 5 hours. |
| Bulk Density | 3.06 (Av.) | 3.11 | 3.14 | 3.16 | 3.50 (av.) | 3.53 | 3.59 | 3.48 | 3.48. |
| Structure of Cast Block | Wormy and porous throughout block. | Porous | Wormy and porous throughout block. | Porous | Very dense, flinty. | Very dense, flinty. | Very dense, flinty. | Very dense, flinty. | Very dense, flinty. |

Referring further to the various fusions of Table I showing the effect of various pre-heat-treatments of the chromite ore prior to fusion, it is noted that fusion No. 1, in which the chromite ore received no heat-treatment prior to its fusion with alumina, produced fused cast articles which were wormy and porous throughout and had an average bulk density of 3.06. Actually, the bulk density figure given for fusion No. 1 in Table I is the average of the bulk densities of cast shapes made from four different runs or fusions of raw mix of the same composition, the separate bulk densities being 2.99, 3.05, 3.05 and 3.17. Fusion No. 1 is illustrative of the results invariably obtained to fusion at temperatures ranging from 800° C. for 5 hours to temperatures as high as 1400° C. for 5 hours. It is noted that in every case the resulting fused cast shape was very dense and flinty in physical structure and the bulk density of the articles ranged from 3.48 to 3.59.

The dense physical structure characterizing articles made according to the present invention is graphically depicted in Figure 1 of the drawing which was sketched from an actual photograph of a cross-section through a 9" x 4½" x 2½" block made according to fusion No. 5. The block 8 is dense and substantially non-porous throughout except for a single localized shrinkage cavity 9. The vastly superior resistance to corrosion and erosion stems from the higher density and freedom from scattered porosity within the block.

Table II presents a series of fusions made from various proportions of Turkish chrome ore, such as a Turkish chrome ore of the composition given above, and fused alumina, and in which the chromite ore was pre-fused prior to its use in the raw batch from which the fused cast article was made. In every instance the resulting articles exhibited a high bulk density and had a very dense and flinty non-porous structure. The results obtained from fusions 10–13 show that the pre-heat-treatment of the chromite ore can amount to complete fusion of the ore although, as shown in Table I as well as the other tables presented herein, for practical purposes it is not essential that the chromite ore be subjected to complete fusion, as roasting at temperatures of 800° C. and above has been found to accomplish results in respect of high density and non-porosity fully as satisfactory as those obtained when the chromite ore is completely fused prior to its use in the raw batch from which the cast article is made. Fusion No. 14 is presented for comparison and shows the inferior porous structure and low density obtained from the same mixture of ingredients when the chromite ore is not subjected to fusion or other heat-treatment prior to its fusion with the alumina.

Table II

|  | Fusion No. | | | | |
| --- | --- | --- | --- | --- | --- |
|  | 10 | 11 | 12 | 13 | 14 |
| Percent Turkish Chrome Ore | 30 | 25 | 20 | 15 | 25. |
| Percent Fused Alumina | 70 | 75 | 80 | 85 | 75. |
| Pre-Treatment of Chrome Ore | Prefused | Prefused | Prefused | Prefused | None. |
| Bulk Density | 3.61 | 3.61 | 3.68 | 3.74 | 3.25. |
| Structure of Cast Block | Very dense and flinty. Non-porous. | Very dense and flinty. Non-porous. | Very dense and flinty. Non-porous. | Very dense and flinty. Non-porous. | Porous throughout. |

The series of fusions Nos. 15–21 shown in Table III are illustrative of the results obtained from various fusions of Philippine chromite ore and fused alumina in which the percentage of chromite ore in the raw mix ranges from 15% to as much as 40%. The chromite ore in the fusions of Table III, except for fusion No. 1 which is repeated for purposes of comparison, was pre-treated by roasting the chromite ore used in fusions Nos. 15, 16, 17, and 18, at 1400° C. for 5 hours and roasting the chromite ore used in fusions Nos. 19, 20, and 21 at 1200° C. for 5 hours. The fused cast articles resulting from each of these fusions had bulk densities ranging from 3.43 for fusion No. 20 to 3.66 for fusion No. 18. Also, the resulting cast shapes were extremely dense and flinty and substantially free from porosity except for a single localized shrinkage cavity. Fusion No. 1, shown in Table III for purposes of comparison, had a bulk density of only 3.06 and was wormy and porous throughout the body of the article.

Table III

|  | Fusion No. | | | | | | | |
| --- | --- | --- | --- | --- | --- | --- | --- | --- |
|  | 15 | 16 | 17 | 18 | 19 | 20 | 21 | 1 |
| Percent Philippine Chrome Ore. | 30 | 25 | 20 | 15 | 25 | 35 | 40 | 25. |
| Percent Fused Alumina. | 70 | 75 | 80 | 85 | 75 | 65 | 60 | 75. |
| Pre-Treatment of Chrome Ore. | Roasted 1,400° C., 5 hrs. | Roasted 1,400° C., 5 hrs. | Roasted 1,400° C., 5 hrs. | Roasted 1,400° C., 5 hrs. | Roasted 1,200° C., 5 hrs. | Roasted 1,200° C., 5 hrs. | Roasted 1,200° C., 5 hrs. | None. |
| Bulk Density | 3.47 | 3.48 | 3.62 | 3.66 | 3.48 | 3.43 | 3.51 | 3.06. |
| Structure of Cast Block. | Very dense and flinty. Nonporous. | Very dense and flinty. Nonporous. | Very dense and flinty. Nonporous. | Very dense and flinty. Nonporous. | Very dense and flinty. Nonporous. | Very dense and flinty. Nonporous. | Very dense and flinty. Nonporous. | Wormy and porous throughout. |

Table IV presents the results obtained with fused cast articles made from various compositions of Philippine chromite ore and fused alumina in which the chromite ore was, prior to fusion, subjected to a roasting pre-treatment at 800° C. for 5 hours. Again, the resulting cast articles had high bulk densities ranging from 3.42 to 3.56 and were dense and flinty with little or no porosity. Fusion No. 1 is repeated for comparative purposes.

Table IV

|  | Fusion No. | | | | |
| --- | --- | --- | --- | --- | --- |
|  | 22 | 23 | 24 | 25 | 1 |
| Percent Philippine Chrome Ore | 30 | 25 | 20 | 15 | 25. |
| Percent Fused Alumina | 70 | 75 | 80 | 85 | 75. |
| Pre-Treatment of Chrome Ore | Roasted 800° C. 5 hours. | Roasted 800° C. 5 hours. | Roasted 800° C. 5 hours. | Roasted 800° C. 5 hours. | None. |
| Bulk Density | 3.42 | 3.51 | 3.56 | 3.42 | 3.06. |
| Structure of Cast Block | Dense. Slight pinholing in center. | Very dense and flinty. Non-porous. | Very dense and flinty. Non-porous. | Dense and flinty. Non-porous. | Wormy and porous throughout. |

Fusions Nos. 26, 27, 23, and 29 of Table V are presented to show the results obtained by carrying out the present invention with various types of mixes containing chromite ores. Fusion No. 26 shows the results of a fusion of 100% Turkish chromite ore, the ore having been first roasted at 800° C. for 5 hours. The resulting article had a bulk density of 3.85 and was very dense and non-porous. Fusions Nos. 23 and 27 show the results obtained with different types of chromite ore, mix No. 23 being illustrative of a fusion of Philippine chromite ore and fused alumina whereas fusion No. 27 is illustrative of a fusion of Turkish chromite ore and fused alumina, the chromite ore in each instance being subjected to a pre-heat-treatment for several hours. The resulting cast articles again were very dense and flinty in structure with little or no porosity. Fusion No. 29 is illustrative of the results obtained with fusions of 40% Philippine chromite ore and 60% magnesia, the chromite ore being roasted at 1200° C. prior to the fusion operation. The magnesia used was a commercial grade of magnesia known as sea water magnesia running about 96% or more MgO. The resulting cast articles were dense and non-porous and had a bulk density of 3.41.

Fusions Nos. 30 and 31 of Table VI are presented to show that the effects of the pre-treatment of the chromite ore are permanent in character and that it is not essential that the chromite ore be used in the fusion operation immediately after its preliminary heat-treatment. Fusion No. 30 utilized Philippine chromite ore which had been previously roasted at 800° C. for 5 hours and used immediately following the roasting treatment, whereas fusion No. 31 utilized the same type of Philippine chromite ore subjected to the same pre-heat-treatment of roasting at 800° C. for 5 hours but stored in unsealed containers for six months prior to use in the fusion operation. The resulting articles were substantially identical in character, both having high bulk densities and being very dense and flinty, and non-porous in structure.

Table VI

| | Fusion No. | |
|---|---|---|
| | 30 | 31 |
| Percent Philippine Chrome Ore | 25 | 25. |
| Percent Fused Alumina | 75 | 75. |
| Pre-Treatment of Chrome Ore | Roasted 800° C. 5 hours and used immediately. | Roasted 800° C. 5 hours and stored unsealed 6 months before use. |
| Bulk Density | 3.53 | 3.52. |
| Structure of Cast Block | Very Dense and flinty. Nonporous. | Very Dense and flinty. Nonporous. |

Table VII below presents for comparison the resistance to corrosion of fused cast refractory shapes made from 25 parts of chromite ore and 75 parts of fused alumina where the chromite ore had not been previously treated and also where the chromite ore had been treated in accordance with the present invention. It is noted that the cast shapes made in accordance with the present invention reflect a marked superiority in corrosion resistance resulting from the dense and flinty non-porous structure and high density over blocks of similar composition made from untreated chromite ore.

Table VII

| | Fusion No. | | |
|---|---|---|---|
| | 1 | 4 | 5 |
| Percent Philippine Chrome Ore | 25 | 25 | 25. |
| Percent Fused Alumina | 75 | 75 | 75. |
| Pre-Treatment of Chrome Ore | None | Roasted 800° C. No holding period at maximum temperature. | Roasted 800° C. 5 hours. |
| Density | 3.06 | 3.16 | 3.50. |
| Structure of Cast Block | Wormy and porous throughout. | Porous | Very dense and flinty. Nonporous. |
| Corrosion Test Inches penetration | .165 | .136 | .113. |
| Corrosion Factor | 62 | 51 | 43. |

The corrosion test used for determining the resistance to corrosion as reported in Table VII consisted of the following testing procedure. The cast compositions to be tested in the form of 9" x 4½" x 2½" straight brick shapes, together with a standard brick of the same size and shape of known resistance to corrosion, were installed side by side in vertical positions as lining members forming the inner lining of a glass melting tank. Soda-lime glass cullet was then placed in the tank formed by the test brick shapes and standard. A crown structure supporting a series of silicon carbide heating elements was mounted above the wall structure as a covering for the tank, and the tank temperature raised in a Table V

| | Fusion No. | | | |
|---|---|---|---|---|
| | 26 | 27 | 23 | 29 |
| Percent Philippine Chrome Ore | | | 25 | 40. |
| Percent Turkish Chrome Ore | 100 | 25 | | |
| Percent Fused Alumina | | 75 | 75 | |
| Percent Magnesia | | | | 60. |
| Pre-Treatment of Chrome Ore | Roasted 800° C. 5 hours. | Roasted 1,200° C. 5 hours. | Roasted 800° C. 5 hours. | Roasted 1,200° C. No hold. |
| Bulk Density | 3.85 | 3.62 | 3.51 | 3.41. |
| Structure of Cast Block | Very dense and non-porous. | Very dense and flinty. Non-porous. | Very dense and flinty. Non-porous. | Dense and non-porous. | period of 11 hours to 1500° C. and held at that temperature for a period of 95 hours. The tank was then drained by withdrawal of the molten glass from the tank through a hole in the bottom of the tank.

After cooling to room temperature the bricks were removed from the tank and the depth of the cut caused by corrosive action of the glass at the air-refractory-glass interface was measured in inches at 1-inch intervals along the width of each brick. The average of the individual depths of cut for each brick was taken as the penetration figure for each brick. The corrosion factor was then determined for each test brick by dividing the average depth of cut for the test brick by the average depth of cut on the standard control brick and multiplying by 100. For example, a corrosion factor of 62 means that the corrosion rate amounted to 62% of the corrosion rate for the standard article.

Having described the invention in detail it is desired to claim:

1. A fused cast refractory article containing by oxide analysis from 8 to 50% chromium oxide derived from chromite ore, said article having been formed from a chromite ore-containing fusion selected from the group consisting of a fusion of chromite ore alone, chromite ore and alumina, and chromite ore and magnesia, said article having a bulk density of between 3.40 and 3.85, said article in the as-cast condition having a dense, non-porous crystalline structure except for the localized shrinkage cavity thereof.

2. A process of making fused cast refractory articles from chromite-ore-containing mixes selected from the group consisting of chromite ore, chromite ore and alumina, and chromite ore and magnesia, which comprises heating the chromite ore to a temperature of over 800° C. for a sufficient period of time to render the resulting fused cast refractory article made therefrom of dense, non-porous crystalline structure, mixing the heat-treated solid chromite ore with the remainder of the raw batch, fusing the raw batch, pouring the fused material into a mold and solidifying the resulting formed article.

3. A process of making fused cast refractory articles from chromite-ore-containing mixes selected from the group consisting of chromite ore, chromite ore and alumina, and chromite ore and magnesia, which comprises mixing chromite ore with the remaining ingredients of the raw batch, heating the resulting chromite-containing raw batch to a temperature of at least 800° C. for a sufficient period of time to render the resulting fused cast article made therefrom of dense, non-porous crystalline structure, fusing the heat-treated, solid raw batch, pouring the fused material into a mold and solidifying the resulting formed article.

4. A process of making fused cast refractory articles from chromite-ore-containing mixes selected from the group consisting of chromite ore, chromite ore and alumina, and chromite ore and magnesia, which comprises heating the chromite ore to a temperature of at least 800° C. for a sufficient period of time to render the resulting fused cast article made therefrom of dense, non-porous crystalline structure, fusing a raw batch containing said heat-treated solid chromite ore, pouring the fused material into a mold and solidifying the resulting formed article.

5. A fused cast refractory article consisting of a fusion of chromite ore and alumina and containing 8 to 50% chromium oxide derived from chromite ore, the said article consisting essentially of a solid solution of aluminum oxide and chromite in which solution aluminum oxide is present in solid solution in addition to any aluminum oxide present as a spinel in the chromite, any residual impurities from the chromite ore and aluminum oxide being present as interstitial impurities in the final fusion, said article in the as-cast condition having a dense, non-porous crystalline structure exception for the localized shrinkage cavity thereof and having an overall density of between 3.40 and 3.85.

6. A fused cast refractory article formed from a fusion of chromite ore alone, said article in the as-cast condition having a dense, non-porous crystalline structure except for the localized shrinkage cavity thereof, and having an overall density of about 3.85.

References Cited in the file of this patent

UNITED STATES PATENTS

| | | |
|---|---|---|
| 2,060,697 | Seil | Nov. 10, 1936 |
| 2,279,260 | Benner et al. | Apr. 7, 1942 |
| 2,636,827 | Lanser et al. | Apr. 28, 1953 |

FOREIGN PATENTS

| | | |
|---|---|---|
| 451,493 | Great Britain | Aug. 4, 1936 |